(12) United States Patent
Zhang et al.

(10) Patent No.: US 11,934,931 B2
(45) Date of Patent: Mar. 19, 2024

(54) DECISION TREE TRAINING USING A DATABASE SYSTEM

(71) Applicant: Shape Security, Inc., Mountain View, CA (US)

(72) Inventors: Bei Zhang, San Jose, CA (US); Samir Shah, San Francisco, CA (US); Kenton Miller, Sunnyvale, CA (US)

(73) Assignee: SHAPE SECURITY, INC., Seattle, WA (US)

( * ) Notice: Subject to any disclaimer, the term of this patent is extended or adjusted under 35 U.S.C. 154(b) by 1101 days.

(21) Appl. No.: 16/222,974

(22) Filed: Dec. 17, 2018

(65) Prior Publication Data

US 2020/0193332 A1 Jun. 18, 2020

(51) Int. Cl.
*G06F 17/00* (2019.01)
*G06F 16/22* (2019.01)
*G06F 16/245* (2019.01)
*G06F 16/28* (2019.01)
*G06N 5/045* (2023.01)
*G06N 20/20* (2019.01)

(52) U.S. Cl.
CPC ......... *G06N 20/20* (2019.01); *G06F 16/2246* (2019.01); *G06F 16/245* (2019.01); *G06F 16/285* (2019.01); *G06N 5/045* (2013.01)

(58) Field of Classification Search
CPC ...... G06N 20/20; G06N 5/045; G06F 16/245; G06F 16/285; G06F 16/2246
See application file for complete search history.

(56) References Cited

U.S. PATENT DOCUMENTS

| 6,108,648 | A | 8/2000 | Lakshmi et al. |
| 10,733,320 | B2 * | 8/2020 | Nerurkar ................ G06F 16/25 |
| 11,061,902 | B2 * | 7/2021 | Idicula ................... G06N 20/00 |
| 2002/0120435 | A1 | 8/2002 | Frazier |

(Continued)

OTHER PUBLICATIONS

International Seach Report and Written Opinion for International Application No. PCT/US2019/064550, filed Dec. 4, 2019, dated Feb. 12, 2020.

(Continued)

*Primary Examiner* — Greta L Robinson
(74) *Attorney, Agent, or Firm* — Troutman Pepper Hamilton Sanders LLP (F5 PATENTS)

(57) ABSTRACT

In an embodiment, a computer-implemented method for training a decision tree using a database system, the decision tree comprising a plurality nodes, comprises, by one or more computing devices: storing in a database input data for training the decision tree, the input data comprising a plurality of feature values corresponding to a plurality of features; generating a particular node of the plurality of decision nodes by: selecting a subset of the plurality of features and a subset of the input data; using one or more queries to the database system, for each feature of the subset of the plurality of features, calculating an information gain associated with the feature based on the subset of the input data; identifying a particular feature of the subset of the plurality of features associated with the highest information gain; associating the particular node with the particular feature, wherein the particular node causes the decision tree to branch based on the particular feature.

20 Claims, 5 Drawing Sheets

(56) References Cited

U.S. PATENT DOCUMENTS

| | | | |
|---|---|---|---|
| 2006/0003419 A1* | 1/2006 | Pan | A61P 43/00 514/6.9 |
| 2006/0230006 A1 | 10/2006 | Buscema | |
| 2007/0017996 A1* | 1/2007 | Xia | H03M 13/05 235/462.41 |
| 2009/0028198 A1 | 11/2009 | Chen et al. | |
| 2009/0281981 A1 | 11/2009 | Chen et al. | |
| 2014/0172753 A1* | 6/2014 | Nowozin | G06N 20/00 706/12 |
| 2015/0278635 A1 | 10/2015 | Poggio et al. | |
| 2015/0310044 A1 | 10/2015 | Isaacson et al. | |
| 2017/0126627 A1 | 5/2017 | Yang | |
| 2017/0022822 A1 | 8/2017 | Taffet et al. | |
| 2017/0228224 A1 | 8/2017 | Dunn et al. | |
| 2018/0032870 A1* | 2/2018 | Liu | G06Q 40/025 |
| 2018/0082172 A1 | 3/2018 | Patel et al. | |
| 2019/0026489 A1* | 1/2019 | Nerurkar | G06N 20/00 |
| 2019/0188000 A1* | 6/2019 | Chen | G06F 9/5016 |
| 2019/0318104 A1 | 10/2019 | Yoshino | |
| 2019/0347327 A1 | 11/2019 | Patil | |

OTHER PUBLICATIONS

Von Hacht, August, "Implementation of Deep Feedforward Neural Network with CUDA Backend for Efficient and Accurate Natural Image Classification," Department of Physics, Chalmers University of Technology, 69 pp, Jun. 2017.

Preliminary Report on Patentability for PCT/US2019/064552, dated Jun. 16, 2021.

International Preliminary Report on Patentability for PCT/US2019/064552, dated m Jun. 2021.

Dabbura, Imad, "Coding Neural Network—Forward Propagation and Backpropagtion," https://towardsdatascience.com, coding-neural-network-forward-propagation-and-backpropagtion-ccf8cf369f76, 19 pp, Mar. 31, 2018.

International Seach Report and Written Opinion for International Application No. PCT/US2019/064550, filed Dec. 4, 2019, dated Feb. 12, 2020.

Von Hach!, August, "Implementation of Deep Feedforward Neural Network with CUDA Backend for Efficient and Accurate Natural Image Classification," Department of Physics, Chalmers University of Technology, 69 pp, Jun. 2017.

Search Report And The Written Opinion of corresponding PCT Application Serial No. PCT /US 19/64552, dated Mar. 17, 2020.

Imani, Mohsen et al. "Rapi DN N: In-memory Deep Neural Network Acceleration Framework" arXiv [Version 3 published 2018] [Retrieved Apr. 2022] <U RL:https://arxiv.org/abs/1806.05794> (Year: 2018).

Haridas, Harisanker "Deep Neural Network implemented in pure SOL over BigQuery". Towards DataScience [Published Mar. 2018] [Retrieved Apr. 2022] <URL: https://towardsdatascience.com/deep-neural-network-implemented-in-pure-sql-over-bigquery-f3ed245814d3> (Year: 2018).

Carlile, Brad et al. "Columnar Database Techniques for Creating AI Features" arXiv [Published 2017] [Retrieved Apr. 2022] <URL: https://arxiv.org/abs/1712.02882> (Year: 2017).

M. S. Razlighi, M. Imani, F. Koushanfar and T. Rosing, "LookNN: Neural network with no multiplication," Design, Automation & Test in Europe Conference & Exhibition (Date), 2017, 2017, pp. 1775-1780, doi: 10.23919/DATE.2017.7927280. (Year: 2017).

Sergio Fernandes and Jorge Bernardino. 2015. What is BigQuery? In <i >Proceedings of the 19th International Database Engineering Applications Symposium</i> (<i>IDEAS '15</i>}. Association for Computing Machinery, New York, NY, USA, 202-203. DOI :https://doi.org/10.1145/2790755.2790797 (Year: 2015).

Bagherinezhad, Hessam et al. "LCNN: Lookup-based Convolutional Neural Network" arXiv [Published 2017] [Retrieved Apr. 2022] <URL: https://arxiv.org/abs/1611.06473> (Year: 2017).

Bentayeb, Fadila, and Jerome Darmont. "Decision tree modeling with relational views." International Symposium on Methodologies for Intelligent Systems. Springer, Berlin, Heidelberg, 2002. (Year: 2002).

Chen, Engu, and Xin James He. "Crude oil price prediction with decision tree based regression approach." Journal of International Technology and Information Management 27.4 (2019): 2-16. (Year: 2019).

Sugumaran, V., and K. I. Ramachandran. "Effect of number of features on classification of roller bearing faults using SVM and PSVM." Expert Systems with Applications 38.4 (2011): 4088-4096. (Year: 2011).

Doyle, Michelle, and Padraig Cunningham. "A dynamic approach to reducing dialog in on-line decision guides." European Workshop on Advances in Case-Based Reasoning. Springer, Berlin, Heidelberg, 2000. (Year: 2000).

McClean, Sally I. "Data mining and knowledge discovery." (2003): 229-246. (Year: 2003).

Zaklouta, Fatin, and Bogdan Stanciulescu. "Real-time traffic-sign recognition using tree classifiers." IEEE Transactions on Intelligent Transportation Systems 13.4 (2012): 1507-1514. (Year: 2012).

\* cited by examiner

DECISION TREE TRAINING USING A DATABASE SYSTEM

FIELD OF THE DISCLOSURE

One technical field of the disclosure is computer-implemented machine learning systems such as neural networks and classifiers. Another technical field is computer-implemented methods of training a decision tree model. Still another field is databases, such as relational databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning techniques provide a solution to the difficulties of solving complex problems. Machine learning may be used in various kinds of data analysis systems, voice recognition, document recognition, image recognition, recommendations systems, and other applications of artificial intelligence. One technique utilizes decision trees or random forests, which comprise a plurality of decision trees. A decision tree generally contains a plurality of nodes and branches, where each node tests an attribute of input data and branches to other nodes based on the outcome of the test.

A benefit of decision trees is that they learn inherent patterns in different datasets. Thus, a programmer does not have to know the correct attributes and/or branching methods prior to programming the decision tree for the decision tree to provide an accurate result.

However, while machine learning techniques such as decision trees provide a large benefit in solving complex problems, they do so at a high computational cost. Training the decision tree(s) requires a large amount of computing power and memory. The calculations required take a significant amount of both time and processing power to compute. For example, large numbers of training examples are typically used to train decision trees in order to carry out classification or regression tasks. Each training example may include a large number of features, and calculations may be performed for each of the features. Thus, the training process is typically time consuming and resource intensive.

Therefore, there is a need for a technique that reduces the computational cost of training decision trees.

SUMMARY

The appended claims may serve as a summary of the disclosure.

DETAILED DESCRIPTION

Figure 1:
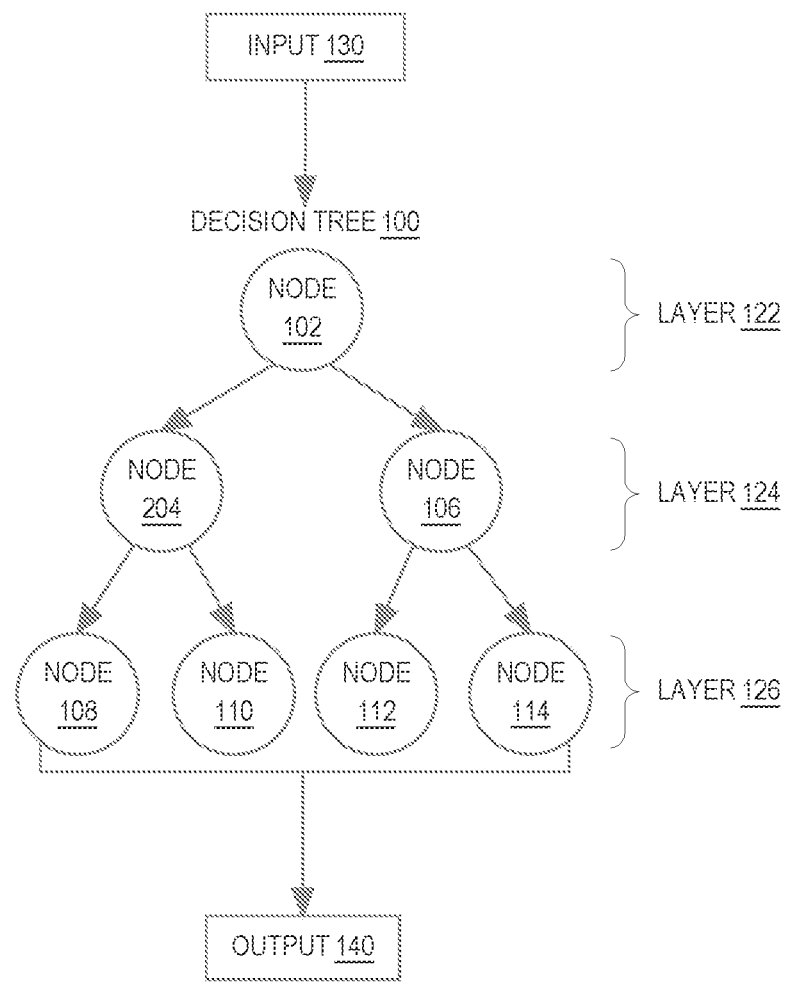
FIG. 1 is a block diagram illustrating an example decision tree, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
2. DECISION TREE OVERVIEW
3. SYSTEM OVERVIEW
    3.1 DECISION TREE TRAINING MODULE
    3.2 DATA ENGINE
    3.3 DATA STORE
4. PROCESS OVERVIEW
5. HARDWARE OVERVIEW

1. General Overview

Techniques are described herein for training one or more decision trees using a database system. In an embodiment, input data for training the one or more decision trees is stored in a database, the input data comprising a plurality of feature values corresponding to a plurality of features. A particular decision node is generated by: selecting a subset of the plurality of features and a subset of the input data; using one or more queries to the database system, for each feature of the subset of the plurality of features, calculating an information gain associated with the feature based on the subset of the input data; identifying a particular feature of the subset of the plurality of features associated with the highest information gain; and associating the particular node with the particular feature, wherein the particular node causes the decision tree to branch based on the particular feature.

In an embodiment, the selecting, calculating, identifying, and associating are performed for each decision node of a plurality of decision nodes of a decision tree. Additionally, the selecting, calculating, identifying, and associating may be performed in parallel for multiple decision nodes.

In an embodiment, after generating the plurality of decision nodes of the decision tree, one or more queries and/or one or more program instructions corresponding to the decision tree are generated. The one or more queries and/or one or more program instructions corresponding to the decision tree, when executed, applies the decision tree to a set of input data.

In an embodiment, to generate a random forest, the selecting, calculating, identifying, and associating are performed for each decision node of a plurality of decision nodes of a plurality of decision tree. The selecting, calculating, identifying, and associating may be performed in parallel for multiple decision nodes and/or multiple decision trees.

Additionally, after generating the plurality of decision trees, one or more queries and/or one or more program instructions corresponding to the random forest are generated. The one or more queries and/or one or more program instructions corresponding to the random forest, when executed, applies the plurality of decision trees to a set of input data.

2. Decision Tree Overview

A decision tree is a machine learning technique that utilizes a set of decision nodes. The decision nodes are arranged into a plurality of layers in a tree, or flow chart, structure. A root node is connected to a plurality of child nodes in a hierarchical structure, with each decision node branching into two or more child nodes, and ending at a plurality of leaf nodes.

Each decision node receives input data and tests a particular attribute of the input data. The decision node may generate and/or store output corresponding to the outcome of the test. Additionally, if the decision node is not a leaf node, a decision is made as to which child node of the decision node to branch to based on the outcome of the test.

Training a machine learning model comprises providing the machine learning model with a set of training data. The training data comprises a plurality of input data and a plurality of corresponding output data. The machine learning model uses the training inputs and the training outputs to infer a method for correlating the input to the output. As explained in further detail below, training a decision tree comprises determining an attribute or feature of the input data on which each decision node should branch.

FIG. 1 illustrates an example decision tree. In the illustrated example, decision tree 100 comprises seven nodes, node 102-114, arranged in three layers, layer 122, layer 124, and layer 126. Each of nodes 102-114 may be configured to test a particular attribute, feature, or value of input data received at the node, and generate output data corresponding to the outcome of the test. Additionally, non-leaf nodes such as nodes 102-106 may branch to a node in the subsequent layer based on the outcome of the test. In other embodiments, more or fewer layers may be used, and the number of nodes and/or branches at each layer may differ based on the embodiment.

In FIG. 1, node 102 receives input 130. In an embodiment, input 130 comprises a plurality of input values. For example, input 130 may be a vector, array, database table, or other multi-dimensional object. Node 102 may be configured to test a particular attribute, feature, or value of the plurality of input values. Based on the outcome of the test, one of child nodes 104 and 106 is selected as the next node to traverse, and input 130 is provided to the selected node. Additionally, output may be generated corresponding to node 102.

For the purpose of illustrating a clear example, assume input 130 comprises three values corresponding to three features: x, y, and z. Node 102 may be configured to determine whether the value of "x" is greater than or less than 3. If "x" is less than 3, then node 102 may branch to node 104, and if "x" is greater than or equal to 3, then node 102 may branch to node 106. Each of node 104 and 106 may branch based on different tests and/or different attributes, features, or values. For example, node 104 may branch to either node 108 or node 110 based on whether the value of "y" is greater than or less than 5, and node 106 may branch to either node 112 or node 114 based on whether the value of "y" is greater than or less than 10.

After reaching a leaf node, such as nodes 108-114, output of the decision tree is generated based on the decision nodes that were traversed or selected. In an embodiment, the output of the decision tree comprises the set of output generated by the selected decision nodes. In other embodiments, the output of the decision tree is generated based on the output of the selected decision nodes. For example, the output may be generated by determining a majority-vote of the output of the traversed decision nodes or by averaging the output of the traversed decision nodes.

As an example, assume decision tree 100 is trained to determine a yes or no categorization based on input 130. Each of nodes 102-114 may generate output indicating a respective yes or no determination. The output 140 of the decision tree 100 may be based on whether more selected nodes generated a yes determination versus a no determination. Alternately, each node may generate an output of 0 corresponding to a no determination and output of 1 corresponding to a yes determination. The output 140 of the decision tree 100 may be an average of the output generated by selected decision nodes, and indicate a percentage likelihood of a yes categorization. For example, assume node 102 generated an output of 0, node 104 generated an output of 1, and node 110 generated an output of 0. The output 140 of the decision tree 100 may be the average of the three output values, or 0.33.

In an embodiment, to train a decision tree, the information gain is calculated for each feature of a plurality of features of a set of training input data, based on corresponding training output data. Information gain is a change in information entropy between one state and another. Information gain for a particular feature is the reduction in entropy from introducing a condition relating to the feature. As an example, assume entropy is calculated for a first feature, X. Assume the condition "Y<3" is introduced, for a second feature, Y. Information gain for a feature, Y, is calculated by subtracting the entropy for X given Y from the entropy of X.

An example equation for calculating entropy of X may be:

$$H(X)=p(X)\log p(X)$$

An example equation for calculating the information gain from introducing the condition "Y<3" may be:

$$IG(X;Y<3)=H(X)-H(X|Y<3)$$

where H(X) is the entropy of X, H(X|Y<3) is the entropy of X conditioned on Y being a value less than 3. This may also be referred to as the mutual information between X and the condition.

Additionally, the information gain may be expressed as a percentage based on the initial entropy of X. The percentage may be referred to as the relative mutual information between X and the condition. An example equation for calculating relative mutual information may be:

$$RMI(X;Y<3)=IG(X;Y<3)/H(X)$$

In an embodiment, training a decision tree comprises calculating the information gain associated with each feature of a plurality of features of the input data, and determining the feature with the highest information gain. The feature of the input data with the highest information gain is selected as a root node. The root node branches based on the selected feature.

Additionally, calculating the information gain may comprise identifying a plurality of conditions for splitting the input data based on each feature of the plurality of features, and identifying the condition associated with the highest information gain. The condition may be a particular value, or a particular range of values, for the feature, depending on the data type associated with the feature. For example, if a feature is associated with numeric data, the condition may be a range. If a feature is associated with string data, the condition may be whether the string includes a particular string value.

The input data is divided based on the branches of the root node. For each branch, the information gain is calculated for each of the remaining features based on the portion of the divided input data corresponding to the branch. The feature of the input data with the highest information gain is selected as the decision node for the branch. For example, assume the root node branches based on the condition "Y<3". The input data is divided into two subsets: a first subset where the value of feature Y is less than 3, and a second subset where the value of feature Y is greater than or equal to 3. A decision node is generated based on the first subset, and a second decision node is generated based on the second subset.

The process of dividing the input data into subsets and generating a decision node corresponding to each subset is repeated for each branch of each decision node, until no features remain or the information gain of all remaining features is 0.

Additionally or alternatively, rather than generating decision nodes by following the generated branches and dividing the input data, each decision node may be trained independently from other decision nodes in the tree. In an embodiment, each decision node is generated based on a subset of features of the input data. Additionally or alternatively, each decision node may be generated based on a subset of the input data. Selecting the subset of features and/or the subset of input data may be performed for each decision node, and the set of features and/or the subset of input data may be different for each decision node. Additionally, the subset of features and/or the subset of input data may be selected randomly for each decision node. For each decision node, the information gain is calculated for each feature of the input data with the highest information gain is selected as the feature for that decision node.

In an embodiment, a number of decision nodes for the decision tree may be determined and the steps described above are performed a number of times based on the determined number of decision nodes. For example, for decision tree 100, since it comprises three levels and each node branches in two, decision tree 100 comprises seven decision nodes. The steps of selecting a subset of features and/or input data, calculating information gain, and determining a feature corresponding to the highest information gain are performed seven times to generate the seven decision nodes. After the decision nodes are generated, the decision nodes may be connected based on their location in the decision tree.

A random forest is a machine learning technique that utilizes a plurality of decision trees. Input data is provided to each decision tree of the plurality of decision trees, and each decision tree trains a respective output. The output of the random forest is generated based on the plurality of decision trees. In an embodiment, the output of the random forest comprises the set of output generated by the plurality of decision trees. In other embodiments, the output of the random forest is generated based on the output of the plurality of decision trees. For example, the output may be generated by determining a majority-vote of the output of the decision trees or by averaging the output of the decision trees.

Figure 2:
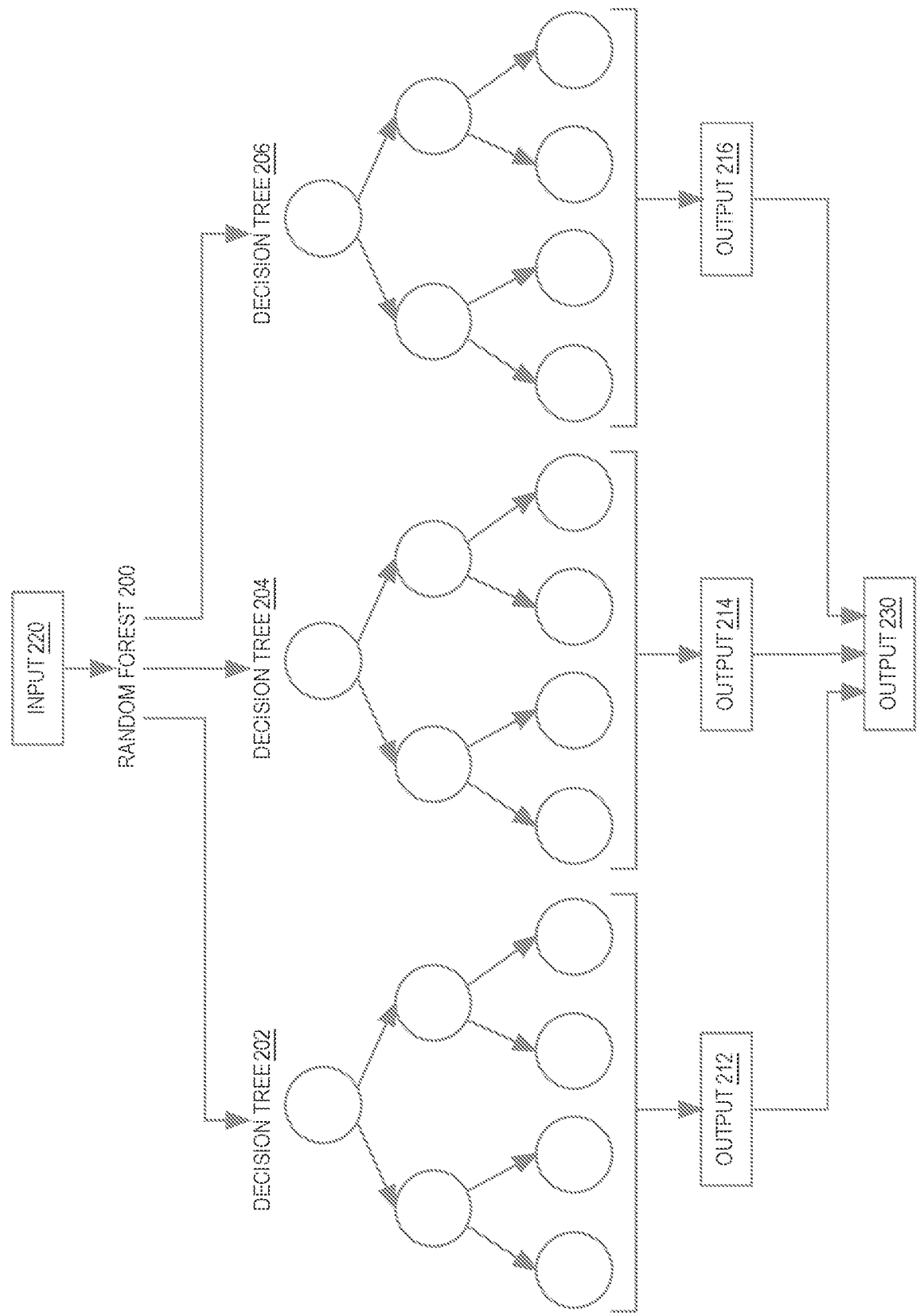
FIG. 2 is a block diagram illustrating an example random forest, according to an embodiment.

FIG. 2 illustrates an example random forest 200. In the illustrated example, random forest 200 comprises three decision trees, decision tree 210, decision tree 220, and decision tree 230. Each of decision tree 210, decision tree 220, and decision tree 230 comprises a set of decision nodes 212, 222, and 232, respectively. In other embodiments, random forest 200 may comprise more or fewer decision trees, and each decision tree may comprise more or fewer nodes. Additionally, the number of nodes and/or layers at each decision tree may be different.

Each of decision tree 210, decision tree 220, and decision tree 230 receives input 240 and generates output 214, 224, and 234, respectively. Output 250 of the random forest is generated based on outputs 214, 224, and 234.

As an example, assume random forest 200 is configured to determine a yes or no categorization based on input 240. Each of output 214, 224, and 234 may indicate a respective yes or no determination. The output 250 of the random forest 200 may be based on whether more decision trees generated a yes determination versus a no determination. For example, if output 214 indicates a yes determination and outputs 224 and 234 indicate a no determination, then output 250 may indicate a no determination. Alternately, the output 250 of the random forest 200 may be an average of the outputs 214, 224, and 234. For example, each output may be a value of 0 for a no determination and a value of 1 for a yes determination. Assume output 214 is 0, output 224 is 1, and output 234 is also 0. The output 250 of the random forest 200 may be the average of the three decision tree output values, or 0.33.

Each decision tree may branch in different ways. That is, while each decision tree may receive the same set of input data, the root node of each decision tree may test a different attribute, feature, or value of the input data. Similarly, subsequent decision nodes may also test a different attribute, feature or value of the input data compared to decision nodes of the same level and/or location in the other decision tree(s).

In an embodiment, training input data comprises a plurality of attributes or features and each decision tree of the random forest is trained based on a different subset of the plurality of attributes or features. For example, assume input data 240 comprises ten features, A-J. Decision tree 210 may be trained to test features A-G, decision tree 220 may be trained to test features A-D and F-H, and decision tree 230 may be trained to test features D-J.

3. Overview of Example Embodiments

Figure 3:
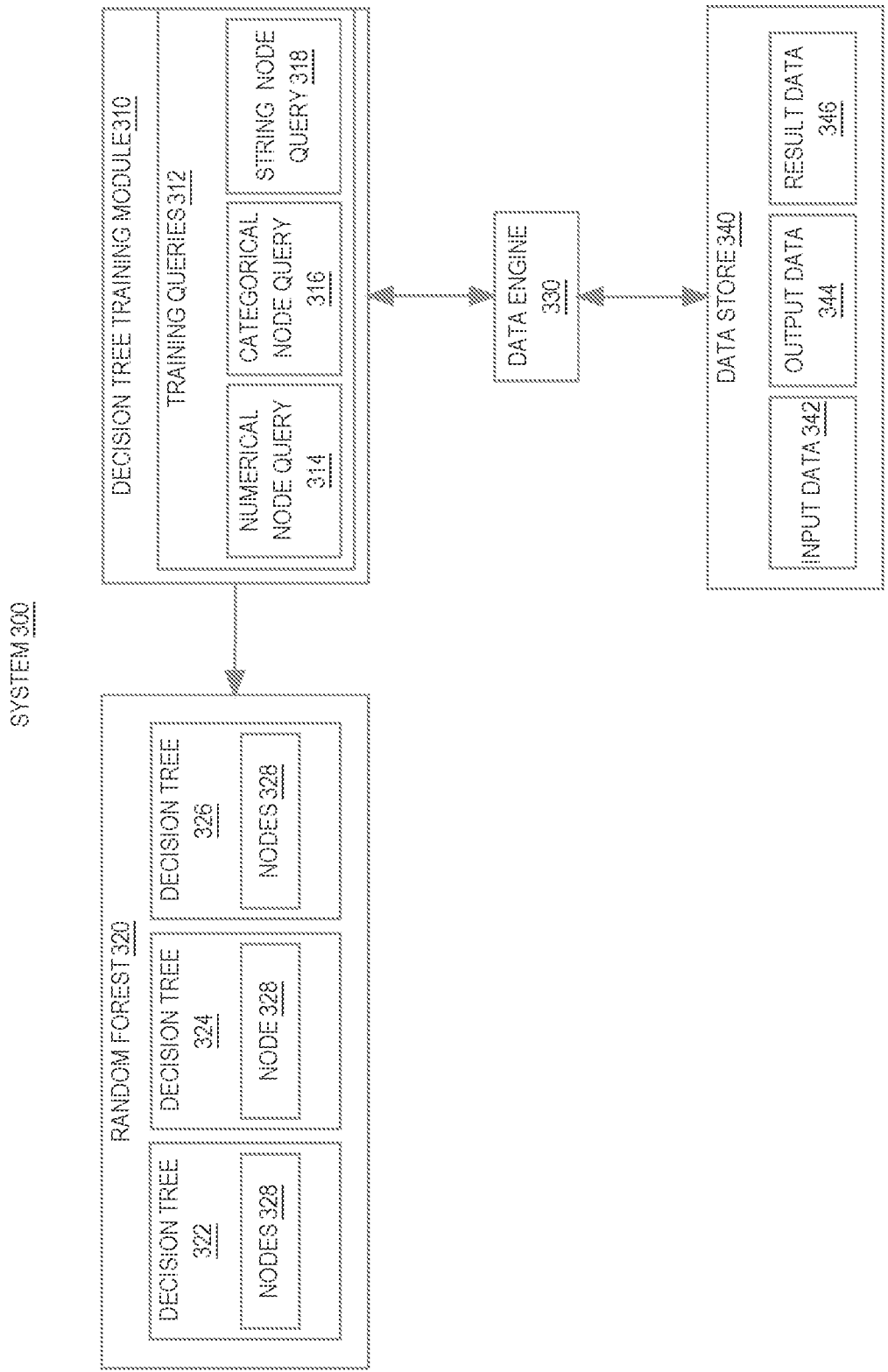
FIG. 3 is a block diagram illustrating an example system in which the techniques described herein may be practiced, according to an embodiment.

In an embodiment, a system 300 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 3 illustrates only one of many possible arrangements of components configured to execute the programming described herein. Other arrangements may include fewer or different components, and the division of work between the components may vary depending on the arrangement.

In FIG. 3, system 300 comprises decision tree training module 310, random forest 320, data engine 330, data store 340, and application program 350. In an embodiment, each of decision tree training module 310, random forest 320, data engine 330, data store 340, and application program 350 are located at or executing on one or more computing devices. Additionally or alternatively, two or more of decision tree training module 310, random forest 320, data engine 330, data store 340, and application program 350 may be located at or executing on the same or overlapping sets of one or more computing devices. Example computing devices include, but are not limited to, servers, racks, workstations, personal computers, laptops, wired devices, wireless devices such as mobile phones or tablets, multi-processor systems, and the like. Additionally or alternatively, one or more of decision tree training module 310, random forest 320, data engine 330, data store 340, and application program 350 may be located at or executing on one or more virtual computing instances, such as Microsoft Azure, Oracle Cloud, Amazon Elastic Compute Cloud (EC2), or Google Compute Engine instances.

3.1 Decision Tree Training Module

In an embodiment, a decision tree training module 310 comprises program instructions that are programmed or configured to receive training input data and training output data and generate one or more decision trees. Additionally or alternatively, decision tree training module 310 comprises program instructions that are programmed or configured to receive training input data and training output data and generate one or more random forests, each random forest comprising a plurality of decision trees.

In the embodiment illustrated in FIG. 3, decision tree training module 310 receives training data, such as input data 342 and output data 344, and generates a random forest 320. In FIG. 3, random forest 320 comprises decision tree 322, decision tree 324, and decision tree 326. Each of decision trees 322, 324, and 326 comprise a respective plurality of nodes 328. Each of the nodes 328 may be associated with a particular feature of input data 342 and branch based on applying a condition to the particular feature of the input data 342.

In an embodiment, decision tree training module 310 is programmed or configured to generate a decision tree based on a subset of the input data 342. Additionally or alternatively, decision tree training module 310 may be programmed or configured to generate the decision tree based on a subset of a plurality of features of the input data 342. For example, assume input data 342 comprises 1000 sets of input, each input comprising 50 features. Decision tree training module 310 may generate decision tree based on 20 features and 500 set of input from the input data. The subset of features and/or the subset of the input data may be selected randomly.

In an embodiment, decision tree training module 310 is programmed or configured to generate the layers of the decision tree in sequential order. Generating decision nodes of each layer may be based on dividing the training data based on how the previous decision nodes branch, as discussed above. If a subset of features and/or a subset of training data are used to generate the decision tree, the same subset(s) may be used to generate all nodes of the decision tree. If decision tree training module 310 generates a random forest, the subset(s) may be selected separately for each decision tree.

In other embodiments, decision tree training module 310 is programmed or configured to train nodes of a decision tree separately. If a subset of features and/or a subset of training data are used to generate the decision tree, the subset(s) may be selected separately for each decision node. Each decision node may therefore be generated based on a different subset of features and/or training data.

Additionally, the subset of training data selected for each node may be filtered based on how one or more previous decision nodes branch. For example, a parent node may branch based on whether the value of feature A is greater than or less than 3. A first child node may be trained using a subset of training data where A is greater than or equal to 3. A second child node may be trained using a subset of training data where A is less than 3. However, the first child node and the second child node may each be trained using a different subset of features. For example, the first child node may be trained based on features C, D, and E, while the second child node may be trained based on features D, F, and G.

Since training each branch of the decision tree is not based on what features are selected at each other branch, some or all of the branches of the decision tree may be generated in parallel. Referring to the above example, after the parent node is trained, the first and second child nodes may be trained in parallel. If decision tree training module 310 generates a random forest, some or all of the decision trees of the random forest may be generated in parallel. Thus, at any given time, multiple nodes may be training, both across decision trees and within a particular decision tree.

In an embodiment, decision tree training module 310 comprises one or more queries 312 which, when executed, performs one or more functions for training a decision tree, such as: retrieving training input data 342 and training output data 344 from data store 340, calculating information gain for one or more features of input data 342, identifying a feature associated with the highest information gain, etc.

For the purpose of illustrating a clear example, assume a feature is associated with a set of discrete feature values. A query may, when executed by system 300, identify the set of discrete feature values and calculate, for each discrete feature value, an associated information gain. In an embodiment, one or more queries may be configured to calculate information gain for a particular data type. Each query may receive input indicating a particular feature, such as a column identifier or a feature name, and generate output indicating information gain associated with the particular feature. Each query may be configured to process data of the respective data type. Additionally, each query may be configured to identify one or more candidate feature values (for branching a decision node), and calculate the information gain for the one or more candidate features. The method by which the one or more candidate feature values are identified may vary depending on the associated data type of a query and the particular implementation.

In the embodiment illustrated in FIG. 3, the decision tree training queries 312 comprise a numerical node query 314, categorical node query 316, and string node query 318. Each query is associated with a respective feature data type—numerical node query 314 is associated with numerical values, categorical node query 316 is associated with categorical values, and string node query 318 is associated with string values.

In an embodiment, numerical node query 314 is configured to identify a plurality of candidate values on which the training input data may be split, calculate an information gain associated with each candidate value of the plurality of candidate values, and generate output indicating the plurality of candidate values and their associated information gain. The highest information gain may be used as the information gain of the particular feature, when comparing against the information gain of other features. If the particular feature is selected as a decision node, the decision node may branch based on the candidate value that was associated with the highest information gain. For example, the decision node may branch based on whether a feature value of the particular feature is greater, equal to, and/or less than the candidate value.

In an embodiment, identifying the plurality of values comprises sorting the training input data based on the particular feature and selecting feature values at regular intervals from the sorted input data. In other embodiments, other methods for identifying a plurality of values may be used, such as identifying frequently occurring or common values, an average value, minimum and maximum values, etc.

In an embodiment, categorical node query 316 is configured to identify a plurality of discrete values for the particular feature in the training input data, calculate an information gain associated with each discrete value, and generate output indicating the plurality of discrete values and their associated information gain. The highest information gain may be used as the information gain of the particular feature, when comparing against the information gain of other features. If the particular feature is selected as a decision node, the decision node may branch based on the discrete value that was associated with the highest information gain. For example, the decision node may branch based on whether a feature value of the particular feature is the discrete value.

In an embodiment, string node query 318 is configured to identify a plurality of string tokens from the feature values of the particular feature in the training input data, calculate an information gain associated with each string token, and generate output indicating the plurality of string tokens and their associated information gain. The highest information gain may be used as the information gain of the particular feature, when comparing against the information gain of other features. If the particular feature is selected as a decision node, the decision node may branch based on the string token that was associated with the highest information gain. For example, the decision node may branch based on whether a feature value of the particular feature includes the string token.

In an embodiment, identifying the plurality of tokens comprises determining a plurality of string values for the particular feature from the training input data. Each string value may be split into one or more tokens. String values may be split on, for example, spaces; delimiters such as commas, periods, semi-colons, and dashes; punctuation marks such as question marks, periods, and exclamation points; special characters or symbols such as tabs and carriage returns; or any other characters or expressions. The plurality of tokens may comprise one or more unique tokens from the split string values.

In an embodiment, the decision tree training module 310 is programmed or configured to generate one or more program instructions which, when executed, applies the generated decision tree(s) and/or random forest(s) to input data. Additionally or alternatively, the decision tree training module 310 may be programmed or configured to generate one or more queries which, when executed by a database system, applies the generated decision tree(s) and/or random forest(s) to input data. In some embodiments, the decision tree training module 310 generates the one or more queries, and the one or more queries may be transformed by the decision tree training module 310 or other applications, programs, or modules, into one or more program instructions which, when executed, applies the generated decision tree(s) and/or random forest(s) to input data.

For the purpose of illustrating a clear example, assume a decision node tests whether a particular feature value contains the string token "537." An example portion of a query corresponding to the decision node may be:

IF(IFNULL(*pv.nr.ut*,"default value")LIKE "%537%", 1.0,0.0)

In the above example, assume "pv.nr.ut" refers to the column corresponding to the particular feature. The IF function determines whether the value of the input data in column "pv.nr.ut" contains the token "537." If the value contains the specified token, then the IF function returns an output of 1.0. If the value does not contain the specified token, then the IF function returns an output of 0.0. Additionally, if the feature "pv.nr.ut" is null—that is, the feature does not exist in the input data, then a default value is used.

In an embodiment, a query corresponding to a decision tree comprises a plurality of nested IF functions. Additionally, a query corresponding to a random forest may comprise a plurality of sub-queries, each sub-query corresponding to a particular decision tree. The output of the plurality of sub-queries may be averaged to generate output of the random forest.

An example nested IF function may be:

IF(foo.parameters.params.vndr LIKE %default%",
    IF(pv.nr.ut LIKE "%537%", 1.0, 0.0)
    IF(fooElement.barHash = 77957379.0, 1.0, 0.0))

In the above example, a first IF function determines whether the value of the input data in the column "foo.parameters.params.vndr" contains a default value string token. If the value contains the specified token, then the first IF function proceeds to a second IF function. As discussed above, the second IF function determines whether the value of the input data in column "pv.nr.ut" contains the token "537." If the value contains the specified token, then the second IF function returns an output of 1.0. If the value does not contain the specified token, then the second IF function returns an output of 0.0.

If the value in the column "foo.parameters.params.vndr" does not contain the specified token, then the first IF function proceeds to a third IF function. The third IF function determines whether the value of the input data in the column "fooElement.barHash" is equal to "77957379.0." If the value is equal to the specified amount, then the third IF function returns an output of 1.0. If the value is not equal to the specified amount, then the third IF function returns an output of 0.0.

An example portion of program instructions corresponding to the decision node may be:

if (type_BrowserSignal::bar.pv.nav["fooKey"] defaults
    "default value") contains "537"
    then 1.0
    else 0.0)

In the above example, assume "type_BrowserSignal" corresponds to a set of input data, and "type_BrowserSignal::bar.pv.nav["fooKey"]" references the variable corresponding to particular feature of the input data. The if-statement determines whether "type_BrowserSignal::bar.pv.nav["fooKey"]" contains "537." If the variable contains the specified token, then the if-statement returns a value of 1.0. If it does not contain the specified token, then the if-statement returns a value of 0.0. Additionally, "type_BrowserSignal::bar.pv.nav["fooKey"]" defaults to a default value if the variable does not exist or the value is null.

In an embodiment, program instructions corresponding to a decision tree comprises a plurality of nested if-statements. Additionally, program instructions corresponding to a random forest may comprise a plurality of sets of program instructions, each set of program instructions corresponding to a particular decision tree. The output of the plurality of sets may be averaged to generate output of the random forest.

An example nested if-statement may be:

```
if (lib_Signal::foo.parameters.params.rndr contains "default"
    then (
        if (type_BrowserSignal::bar.pv.nav["fooKey"] contains "537"
            then 1.0 else 0.0))
    else (
        if (type_BrowserSignal::br.foo.barHash == 77957379.0
            then 1.0 else 0.0)))
```

In the above example, a first if-statement determines whether the variable "foo.parameters.params.rndr" contains a default value string token. If the variable contains the specified token, then the first if-statement proceeds to a second if-statement. As discussed above, the second if-statement determines whether "bar.pv.nav["fooKey"]" contains "537." If the variable contains the specified token, then the second if-statement returns a value of 1.0. If the variable does not contain the specified token, then the second if-statement returns a value of 0.0.

If the variable "foo.parameters.params.rndr" does not contain the specified token, then the first if-statement proceeds to a third if-statement. The third if-statement determines whether the variable "br.foo.barHash" is equal to "77957379.0." If the variable is equal to the specified amount, then the third if-statement returns a value of 1.0. If the value is not equal to the specified amount, then the third IF function returns a value of 0.0.

In an embodiment, the one or more program instructions or one or more queries may be executed on a system or computing device separate from system 300. For example, system 300 may generate one or more program instructions and send the one or more program instructions to separate computing devices that execute the one or more program instructions. As another example, system 300 may generate one or more queries and send the one or more queries to a separate computing device.

Additionally or alternatively, system 300 may receive input from a system or computing device separate from system 300, execute the one or more program instructions or one or more queries based on the received input, and provide the output to the system or the computing device.

For example, decision tree training module 310 may train random forest 320 to receive input comprising a request from a client computer to a server computer and determine whether the request is legitimate or illegitimate. As an example, a legitimate request may be from browser of a legitimate user, while an illegitimate request may be from a headless browser or a bot. A separate computing device, such as a server computer, may receive or intercept requests from client computing devices. The separate computing device may execute the one or more queries and/or one or more program instructions using data from the requests as input. Alternately, the computing device may send request data to system 300 and receive an indication from system 300 indicating whether the request was legitimate or illegitimate. Additionally or alternatively, the computing device may store request data in a database at or accessible to system 300, and cause system 300 to execute the one or more queries based on the stored request data.

3.2 Data Engine

In the embodiment illustrated by FIG. 3, application programs interact with data stored in data store 340 via data engine 330. Data engine 330 may be programmed or configured to perform a variety of functions needed for processing requests for data including, but not limited to: receiving queries from application program 350 or decision tree training module 310, executing queries, retrieving data from data store 340, storing data to data store 340, translating retrieved data into a requested format, sending query results to application program 350 or decision tree training module 310, and any other aspects of embodiments described herein.

Additionally or alternatively, data engine 330 provides an API that may be accessed, for example, by application program 350 or decision tree training module 310, to perform the functions related to processing data requests.

In an embodiment, data engine 330 comprises a plurality of computing instances for processing requests. In response to receiving a request, data engine 330 selects one or more computing instances of the plurality to process the request. For example, in response to receiving a plurality of decision node training queries 312, data engine 330 may execute the plurality of queries in parallel using a plurality of computing instances. Additionally or alternatively, each query of the plurality of decision node training queries 312 may be executed using a plurality of computing instances. By executing one or more decision node training queries in parallel, one or more decision trees may be trained more quickly compared to typical approaches that generate each layer of the decision tree and/or each decision node at a time, sequentially.

Additionally or alternatively, data engine 330 may be programmed or configured to optimize query execution based on the requests received and/or the data stored at data store 340. For example, in response to receiving a plurality of decision node training queries 312, data engine 330 may generate an execution plan that optimizes execution of the plurality of decision node training queries 312.

3.3 Data Store

In an embodiment, the data store 340 is a data storage subsystem consisting of programs and data that is stored on any suitable storage device such as one or more hard disk drives, memories, or any other electronic digital data recording device configured to store data. Although data storage system 340 is depicted as a single device in FIG. 3, data storage system 340 may span multiple devices located in one or more physical locations. In an embodiment, data storage system 340 is a distributed file system or a distributed data store comprising a plurality of data nodes. For example, data storage system 340 may be a Google Cloud Storage System, Hadoop Distributed File System (HDFS), MapR File System (MapR FS), HBase, or other suitable distributed data store.

In an embodiment, data store 340 stores data in a column-oriented storage format. Example column-oriented data storage formats include Capacitor, Parquet, Kudu, and Object Relational Columnar (ORC). The particular data storage format may vary depending on the implementation.

Generally, data store 340 stores data related to training a decision tree using a database system including, but not limited to, training input data 342, training output data 344, and result data 346.

Training input data 342 comprises one or more input sets for training a decision tree. Training output data 344 comprises one or more corresponding output sets for training the decision tree. For example, the training input data 342 may comprise a plurality of input sets corresponding to telemetry information for requests to a server computer from a plurality of client computers. Telemetry information may comprise data collected from a client computer that describes usages, states, behaviors, measurements, and/or other metrics, statistics, or values that may indicate what a client computer is, and/or is not, doing. The training output data 344 may comprises a plurality of output sets corresponding to the requests and indicating whether each request was marked as a legitimate or illegitimate request. A legitimate request may be from browser of a legitimate user, while an illegitimate request may be from a headless browser or a bot.

The telemetry information may comprise one or more of: unprocessed data, processed data, or derived data. Unprocessed data comprises raw data collected from the client computer. Processed data may include, for example, converting data into string and/or numeric values, converting data into a standardized format, adding default values for missing attributes, etc. Derived data may be data derived from the collected data. For example, the collected data may include a first timestamp corresponding to a first keypress and a second timestamp corresponding to a second keypress, and the derived data may be a duration calculated based on the first and second timestamps.

Additionally or alternatively, training output data 344 may be included in training input data 342. Referring to the above example, assume the input set comprises a vector, <v1, v2, v3 . . . > where each feature of the vector corresponds to particular telemetry information for a request, or a feature of the request. A particular vector feature may correspond to the legitimacy of the request.

In an embodiment, the training input data 342 and/or the training output data 344 are stored in a columnar format. Each row may correspond to a particular input set of the training input, and each column may correspond to a particular feature of the training. For example, assume input data comprises a vector, <v1, v2, v3 . . . >. The vector may be stored in a particular row such that the value in column 1 is "v1," the value in column 2 is "v2," etc.

One benefit of storing an input set in columnar format is that calculations may be performed for each input in parallel. Referring to the above example, assume the input set comprises a large number of vectors, where each input is stored in a respective column. The columns may be processed in parallel with one another. This results in significantly faster computation compared to processing each input at a time for an input set.

An additional benefit is that a database system is able to index the data stored in each column. For searching on a single field, only the column associated with the field needs to be loaded, and the indexing allows searching to be performed faster. Additionally, the database system may divide the columns into chunks. This allows the database system to identify which chunks are relevant for a computation and only operate on relevant chunks. The database system may also compress computations when performing calculations for each column. For example, if the cardinality of a column is low, that is if a column does not have many different values or many rows share the same values in a particular column, then a calculation may be performed just a single time for the rows.

Result data 346 stores results generated by the plurality of decision tree training queries 312. In an embodiment, result data 346 stores data indicating the information gain associated with one or more features of training input data 342. Result data 346 may be used by decision tree training module 310 to determine which feature is associated with the highest information gain. In an embodiment, result data 346 comprises a plurality of result sets, each result set corresponding to a particular decision node of a plurality of decision nodes being trained.

In an embodiment, result data 346 comprises temporary tables. The temporary tables may be kept only for the duration of executing the decision node training queries 312. In the illustrated embodiment, result data 346 is stored in data store 340. Additionally or alternatively, the result data 346 may be stored in memory of one or more computing devices, such as memory of data engine 330 or one or more computing devices executing decision tree training module 310.

Additionally or alternatively, the data store 340 may be communicatively connected with other components, either directly or indirectly, such as one or more third party data suppliers, application program 350, or other computing devices. Data store 340 may be configured to receive or retrieve input data 342 and/or output data 344 from the one or more third party data suppliers, application program 350, and/or other computing devices.

4. Process Overview

Figure 4:
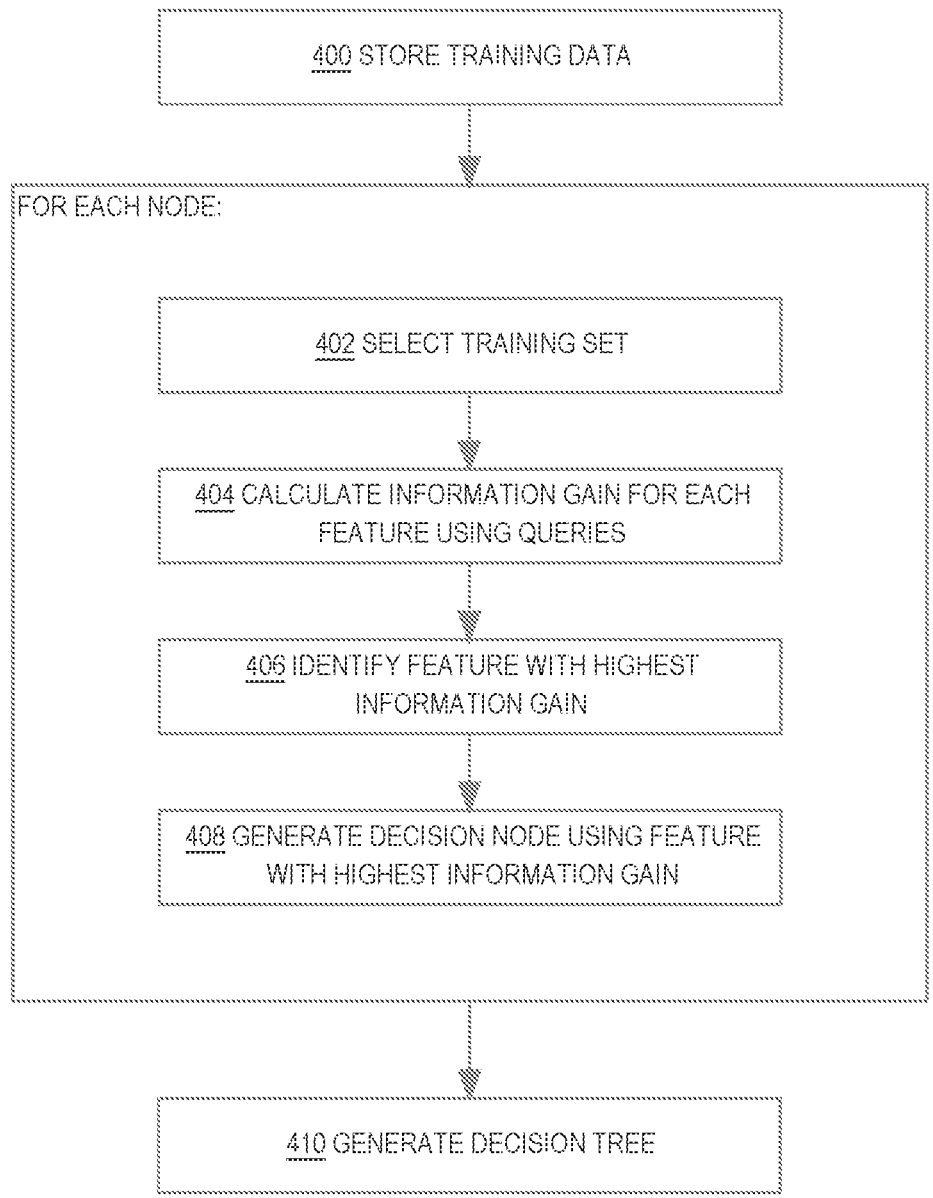
FIG. 4 is a block diagram illustrating an example decision tree training process, according to an embodiment.

FIG. 4 illustrates example steps for training a decision tree using a database system.

Although the steps in FIG. 4 are shown in an order, the steps of FIG. 4 may be performed in any order, and are not limited to the order shown in FIG. 4. Additionally, some steps may be optional, may be performed multiple times, and/or may be performed by different components.

At step 400, training data for training the decision tree is stored. The training data may comprise a plurality of sets of training input data and a plurality of corresponding training output data. Each set of training input data may comprise a plurality of features of the input data. The corresponding training output data indicates the expected output based on the set of training input data. As an example, assume system 300 receives training data for training a decision tree that determines whether a request from a client computer is legitimate or illegitimate. Each set of training input data comprises telemetry information associated with a particular request. The corresponding training output data indicates whether the particular request was marked as legitimate or illegitimate. The training input data and the training output data may be stored in data store 340.

In an embodiment, each set of training input data is stored as a row of a database table. Each feature of the training input data may correspond to a particular row of the database table. Additionally, the corresponding output data may be stored as rows of a second database table.

Steps 402-408 are performed to generate a decision node of the decision tree. In some embodiments, the steps may be performed in parallel for some or all of the decision nodes. That is, some or all of the decision nodes may be generated at the same time.

In an embodiment, a number of decision nodes for the decision tree is determined. The determination may be based on one or more factors such as a number of layers of the decision tree, a number of branches for each node of the decision tree, a structure of the decision tree, etc. For example, system 300 may be configured to generate decision trees that comprise 3 layers and 2 branches per node, for a total of up to 7 nodes. Based on the determined number of decision nodes, the below steps 402-408 are performed for each decision node. For example, if system 300 is configured to generate a decision tree with 7 nodes, decision tree training module 310 may repeat steps 402-408 7 times.

Additionally or alternatively, the decision nodes may be generated in serial, starting at a root node. Generating one or more subsequent decision nodes may be based on how previous decision nodes in the decision tree branches and/or the information gain associated with features that have not been selected for previous decision nodes. As discussed above, after a decision node is generated, the input is divided or filtered based on the branches of the decision node and child nodes are generated based on the divided input data. Rather than generating a pre-determined number of decision nodes, decision tree training module 310 may iteratively repeat steps 402-408 until no features remain or the information gain associated with all remaining features is 0.

At step 402, a set of training data is selected. The decision node is generated based on the selected set of training data. In an embodiment, selecting a set of training data comprises selecting a subset of the plurality of sets of training input data and a corresponding subset of the output data. Additionally or alternatively, selecting a set of training data comprises selecting a subset of features from a plurality of features of the training input data.

For the purpose of illustrating a clear example, assume training input data is stored in a database table. Each database row may correspond to a particular set of training input data, and each database column may correspond to a particular feature of the training input data. Selecting a set of training data may comprise selecting a plurality of rows from the database table and/or a plurality of columns, wherein the plurality of rows is fewer than all of the rows of the database table and the plurality of columns is fewer than all of the columns of the database table.

At step 404, the information gain is calculated for each feature of a plurality of features of the selected training data using one or more queries. The plurality of features of the selected training data may be a subset of the features of the training input data.

In an embodiment, the data type of each feature is determined. Based on the data type, a corresponding query is selected for calculating the information gain of the feature. The corresponding query may be configured to parse data of the corresponding data type. Additionally, the corresponding query may select one or more feature values for which to calculate an associated information gain. The method by which the one or more feature values is selected may vary based on the corresponding data type and the particular embodiment. The query calculates one or more information gain corresponding to the one or more selected feature values. The query may return a result indicating the highest information gain and the feature value associated with the highest information gain. Additionally or alternatively, the query may return a plurality of feature values and their associated information gain. The results may be sorted by information gain. Additionally, the results may be stored temporarily, such as in result data 346.

As an example, a particular feature may have string data values. The corresponding query may be configured to tokenize strings into a plurality of tokens and calculate the information gain associated with each token of the plurality. The query may return a result indicating the token with the highest information gain and the associated information gain.

At step 406, the feature associated with the highest information gain is identified. In an embodiment, identifying the feature associated with the highest information gain comprises comparing a plurality of information gain and feature (or feature value) pairs. Additionally or alternatively, identifying the feature associated with the highest information gain comprises querying one or more results table. The query may retrieve, for each feature, the highest information gain and the feature value associated with the highest information gain, sort the results by information gain, and return a result comprising the highest information gain, feature, and/or the feature value associated with the highest information gain.

At step 408, the decision node is generated based on the feature and feature value with the highest information gain. The decision node branches on the feature value and the feature. For example, assume the feature associated with the highest information gain is "screenDimensionX," and the feature value of "screenDimensionX" associated with the highest information gain is 1280. Decision tree training module 310 may generate a decision node that branches based on whether the value of the feature "screenDimensionX" is greater than 1280 or less than 1280.

One branch of the decision node may correspond to a first result and the other branch may correspond to a second result. The first result and/or the second result may be a subsequent decision node. Additionally, the first result may be a first output value, and the second result may be a second output value. The first output value and the second output value may be based on the training output data.

After all the decision nodes are generated, at step 410, one or more queries corresponding to the decision tree are generated. Additionally or alternatively, one or more program instructions corresponding to the decision tree are generated. The one or more queries and/or the one or more program instructions, when executed, receive or retrieve a set of input data, apply the decision tree to the set of input data, and generate output indicating the result of applying the decision tree to the set of input data. The output may be, for example, a binary result such as I/O and true/false, or a categorical result, such as a particular classification from a set of possible classifications. In an embodiment, the output may be stored to a database table, such as in data store 340, or to one or more data files that may be sent to or accessible by a computing device executing the one or more program instructions and/or the one or more queries. Example data files include JSON, comma separate values, SQL dumps, spreadsheets such as Excel files, and other file types. Additionally or alternatively, the output may be provided to another application, program, function, or module. Additionally or alternatively, the output may be displayed to a user of an application or program, such as a database client application.

Referring to the above example, an application may receive requests from a client computer to a server computer, execute the one or more queries and/or the one or more program instructions using request data as input, and receive output indicating whether the request is legitimate or illegitimate. The application may determine one or more actions to take based on whether the output indicates the request is legitimate or illegitimate.

In an embodiment, generating one or more queries corresponding to the decision tree comprises generating, for each decision node of the decision tree, a query or a portion of a query corresponding to the decision node. The query or the portion of the query corresponding to the decision node may test a particular input data feature. The query, or portion of the query, when executed, may return a first value if the test evaluates to true, or a second value if the test evaluates to false. The first value and/or the second value may be a value returned by a subsequent decision node. That is, rather than returning an output of, for example 1.0 or 0.0, the return value may be a second query or a second portion of a query corresponding to another decision node. Additionally or alternatively, the query, or portion of the query, when executed, may test a plurality of conditions and return a different value based on which condition of the plurality of conditions evaluates to true.

In an embodiment, generating one or more program instructions corresponding to the decision tree comprises generating, for each decision node of the decision tree, one or more respective program instructions corresponding to the decision node. The program instructions corresponding to the decision node may test a particular input data feature. The program instructions, when executed, may return a first value if the test evaluates to true, or a second value if the test evaluates to false. The first value and/or the second value may be a value returned by a subsequent decision node. The return value may comprise one or more second program instructions corresponding to another decision node.

Figure 5:
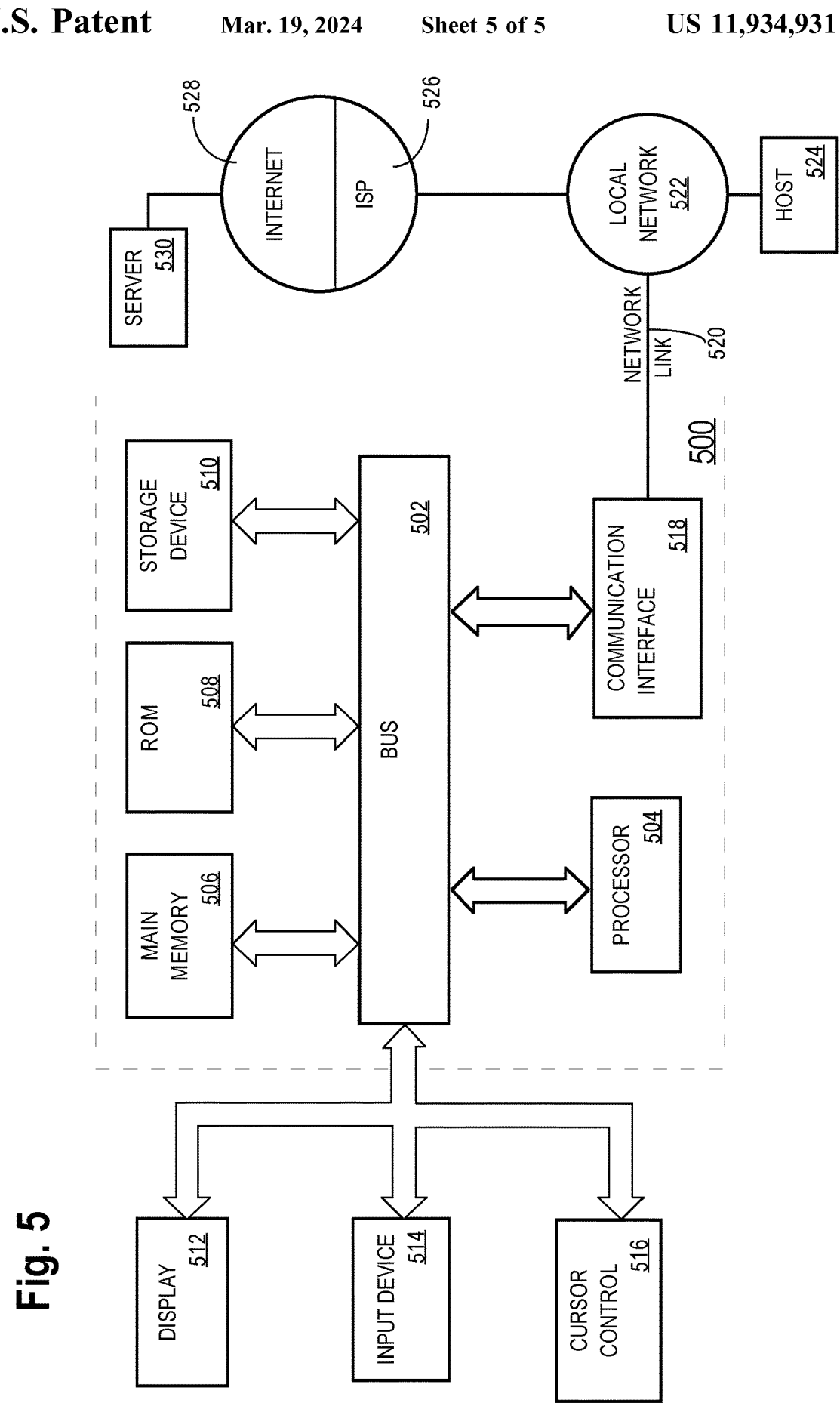
FIG. 5 is a block diagram that illustrates a computer system upon which an embodiment of the invention may be implemented.

FIG. 5 illustrates example steps for training a random forest using a database system.

Although the steps in FIG. 5 are shown in an order, the steps of FIG. 5 may be performed in any order, and are not limited to the order shown in FIG. 5. Additionally, some steps may be optional, may be performed multiple times, and/or may be performed by different components.

At step 500, training data for training the decision tree is stored. The training data may comprise a plurality of sets of training input data and a plurality of corresponding training output data. Each set of training input data may comprise a plurality of features of the input data. The corresponding training output data indicates the expected output based on the set of training input data. As an example, assume system 300 receives training data for training a decision tree that determines whether a request from a client computer is legitimate or illegitimate. Each set of training input data comprises telemetry information associated with a particular request. The corresponding training output data indicates whether the particular request was marked as legitimate or illegitimate. The training input data and the training output data may be stored in data store 340.

In an embodiment, each set of training input data is stored as a row of a database table. Each feature of the training input data may correspond to a particular row of the database table. Additionally, the corresponding output data may be stored as rows of a second database table.

Steps 502-508 are performed to generate a decision node of a decision tree. In some embodiments, the steps may be performed in parallel for some or all of the decision nodes of the decision trees of the random forest. That is, some or all of the decision nodes may be generated at the same time, and some or all of the decision trees may be generated at the same time.

In an embodiment, a number of decision trees for the random forest is determined. Each tree may be generated using one or more techniques described above for generating a decision tree. In some embodiments, the steps may be performed in parallel for some or all of the decision nodes of the decision trees of the random forest. That is, some or all of the decision nodes may be generated at the same time, and some or all of the decision trees may be generated at the same time.

In an embodiment, a number of decision trees is determined. Additionally, a number of decision nodes for the decision tree may be determined. The determination may be based on one or more factors such as a number of layers of each decision tree, a number of branches for each node of the decision tree, a structure of the decision tree, etc. The number of layers, number of branches, and/or the structure of each decision tree may be the same or different, depending on the implementation.

As an example, assume system 300 is configured to generate 3 decision trees, where each decision tree comprises 3 layers and 2 branches per node, for a total of up to 21 decision nodes. Based on the determined number of decision nodes, the above steps 402-408 are performed for each decision node. Referring to the above example, if system 300 is configured to generate a random forest with 3 decision trees each with 7 nodes, decision tree training module 310 may repeat steps 402-408 21 times.

Additionally or alternatively, as discussed above, decision nodes of a decision tree may be generated in serial, where generating one or more subsequent decision nodes is based on how previous decision nodes in the decision tree branches and/or the information gain associated with features that have not been selected for previous decision nodes. Although decision nodes of a decision tree are generated in serial, a plurality of decision trees may be generated in parallel.

In an embodiment, after all the decision nodes are generated, one or more queries corresponding to the random forest are generated. Additionally or alternatively, one or more program instructions corresponding to the random forest are generated. The one or more queries and/or the one or more program instructions, when executed, receive or retrieve a set of input data, apply each decision tree of the random forest to the set of input data, and generate output indicating the result of applying the random forest to the set of input data.

In an embodiment, generating the one or more queries and/or the one or more program instructions corresponding to the random forest comprises generating, for each decision tree of the random forest, one or more queries and/or one or more program instructions corresponding to the decision tree. A query and/or program instruction(s) corresponding to the random forest may include, or reference, the one or more queries and/or one or more program instructions corresponding to each decision tree. Additionally or alternatively, the query and/or program instruction(s) corresponding to the random forest may retrieve output generated by the one or more queries and/or one or more program instructions corresponding to each decision tree. The query and/or program instruction(s) corresponding to the random forest may process the outputs corresponding to the decision trees in the random forest and generate an output for the random forest. For example, a majority-vote of the output of the decision trees may be determined, or an average of the output of the decision trees may be calculated.

To illustrate a clear example, assume the random forest comprises 3 decision trees, and each decision tree outputs a value of 1.0 or 0.0. An example set of program instructions corresponding to the random forest may be:

(decisionTree1+decisionTree2+decisionTree3/3)

where "decisionTree1" refers to the output generated by a first set of program instructions corresponding to a first decision tree, "decisionTree2" refers to the output generated by a second set of program instructions corresponding to a second decision tree, and "decisionTree3" corresponds to a third set of program instructions corresponding to a third decision tree. Each of "decisionTree1," "decisionTree2," and "decisionTree3" may be a call to the respective set of corresponding program instructions and/or to retrieve output generated by executing the respective set of corresponding program instructions. Alternately, each of "decisionTree1," "decisionTree2," and "decisionTree3" may be replaced in-line by the respective set of corresponding program instructions.

5. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method implemented by one or more computer systems, server devices, or client devices for training a decision tree comprising a plurality of decision nodes, the decision tree comprising a plurality of decision nodes, the method comprising:
   storing, in a database, input data for training the decision tree, the input data comprising a plurality of feature values corresponding to a plurality of features;
   generating a particular node of the plurality of decision nodes by:
      selecting a subset of the plurality of features and a subset of the input data;
      using one or more queries to the database, for each feature of the subset of the plurality of features, to calculate an information gain associated with the feature based on the subset of the input data by selecting a subset of the plurality of feature values and calculating the information gain associated with each of the subset of the plurality of feature values by calculating a reduction in entropy from an initial state to a subsequent state when a condition related to each of the subset of the plurality of feature values is introduced;
      identifying a particular feature of the subset of the plurality of features associated with a highest information gain; and
      associating the particular node with the particular feature, wherein the particular node causes the decision tree to branch based on the particular feature.

2. The method of claim 1 further comprising generating the plurality of decision nodes by performing the selecting, calculating, identifying, and associating for each decision nodes of the plurality of decision nodes of the decision tree, wherein generating at least a portion of multiple decision nodes among the plurality of decision nodes is performed in parallel.

3. The method of claim 2 further comprising:
   generating a random forest comprising a plurality of decision trees by generating, for each decision tree of the plurality of decision trees, a respective plurality of decision nodes; and
   generating a query to the database corresponding to the random forest, wherein the query, when executed using the database, applies each decision tree of the plurality of decision trees to a set of input data.

4. The method of claim 1 wherein calculating the information gain associated with each feature comprises:
   determining a data type associated with the feature;
   based on the data type, identifying one or more conditions for partitioning the subset of the input data;

calculating a respective information gain for each condition of the one or more conditions; and
selecting the highest respective information gain as the information gain associated with the feature.

5. The method of claim 4 wherein:
the data type is categorical data and identifying the one or more conditions comprises identifying a plurality of feature categories;
the data type is numerical data and identifying the one or more conditions comprises identifying a plurality of numeric value ranges; or
the data type is strings and identifying the one or more conditions comprises identifying a plurality of token sets, each token set comprising one or more string tokens.

6. A decision tree training device configured to train a decision tree, the decision tree comprising a plurality of decision nodes, the decision tree training device comprising memory comprising a database and programmed instructions stored thereon and one or more processors configured to be capable of executing the stored programmed instructions to cause:
storing, in the database, input data for training the decision tree, the input data comprising a plurality of feature values corresponding to a plurality of features;
generating a particular node of the plurality of decision nodes by:
selecting a subset of the plurality of features and a subset of the input data;
using one or more queries to the database, for each feature of the subset of the plurality of features, to calculate an information gain associated with the feature based on the subset of the input data by selecting a subset of the plurality of feature values and calculating the information gain associated with each of the subset of the plurality of feature values by calculating a reduction in entropy from an initial state to a subsequent state when a condition related to each of the subset of the plurality of feature values is introduced;
identifying a particular feature of the subset of the plurality of features associated with a highest information gain; and
associating the particular node with the particular feature, wherein the particular node causes the decision tree to branch based on the particular feature.

7. The decision tree training device of claim 6 further comprising instructions which, when executed using the one or more processors, cause generating the plurality of decision nodes by performing the selecting, calculating, identifying, and associating for each decision nodes of the plurality of decision nodes of the decision tree, wherein generating at least a portion of multiple decision nodes among the plurality of decision nodes is performed in parallel.

8. The decision tree training device of claim 7 further comprising instructions which, when executed using the one or more processors, cause:
generating a random forest comprising a plurality of decision trees by generating, for each decision tree of the plurality of decision trees, a respective plurality of decision nodes; and
generating a query to the database corresponding to the random forest, wherein the query, when executed using the database, applies each decision tree of the plurality of decision trees to a set of input data.

9. The decision tree training device of claim 6 wherein calculating the information gain associated with each feature comprises:
determining a data type associated with the feature;
based on the data type, identifying one or more conditions for partitioning the subset of the input data;
calculating a respective information gain for each condition of the one or more conditions; and
selecting the highest respective information gain as the information gain associated with the feature.

10. The decision tree training device of claim 9 wherein:
the data type is categorical data and identifying the one or more conditions comprises identifying a plurality of feature categories;
the data type is numerical data and identifying the one or more conditions comprises identifying a plurality of numeric value ranges; or
the data type is strings and identifying the one or more conditions comprises identifying a plurality of token sets, each token set comprising one or more string tokens.

11. A non-transitory computer readable medium having stored thereon instructions for training a decision tree comprising a plurality of decision nodes, comprising executable code that, when executed by one or more processors, causes the processors to:
store, in a database, input data for training the decision tree, the input data comprising a plurality of feature values corresponding to a plurality of features;
generate a particular node of the plurality of decision nodes by:
selecting a subset of the plurality of features and a subset of the input data;
using one or more queries to the database, for each feature of the subset of the plurality of features, to calculate an information gain associated with the feature based on the subset of the input data by selecting a subset of the plurality of feature values and calculating the information gain associated with each of the subset of the plurality of feature values by calculating a reduction in entropy from an initial state to a subsequent state when a condition related to each of the subset of the plurality of feature values is introduced;
identifying a particular feature of the subset of the plurality of features associated with a highest information gain; and
associating the particular node with the particular feature, wherein the particular node causes the decision tree to branch based on the particular feature.

12. The non-transitory computer readable medium of claim 11, wherein the executable code, when executed by the processors further cause generating the plurality of decision nodes by performing the selecting, calculating, identifying, and associating for each decision nodes of the plurality of decision nodes of the decision tree, wherein generating at least a portion of multiple decision nodes among the plurality of decision nodes is performed in parallel.

13. The non-transitory computer readable medium of claim 12, wherein the executable code, when executed by the processors further causes the processors to:
generate a random forest comprising a plurality of decision trees by generating, for each decision tree of the plurality of decision trees, a respective plurality of decision nodes; and generate a query to the database corresponding to the random forest, wherein the query, when executed using the database, applies each decision tree of the plurality of decision trees to a set of input data.

14. The non-transitory computer readable medium of claim 11 wherein calculating the information gain associated with each feature comprises:
determining a data type associated with the feature;
based on the data type, identifying one or more conditions for partitioning the subset of the input data;
calculating a respective information gain for each condition of the one or more conditions; and
selecting the highest respective information gain as the information gain associated with the feature.

15. The non-transitory computer readable medium of claim 14, wherein:
the data type is categorical data and identifying the one or more conditions comprises identifying a plurality of feature categories;
the data type is numerical data and identifying the one or more conditions comprises identifying a plurality of numeric value ranges; or
the data type is strings and identifying the one or more conditions comprises identifying a plurality of token sets, each token set comprising one or more string tokens.

16. A decision tree training system for training a decision tree comprising a plurality of decision nodes, comprising one or more computer systems, server devices, or client devices with memory comprising programmed instructions stored thereon and one or more processors configured to be capable of executing the stored programmed instructions to:
store, in a database, input data for training the decision tree, the input data comprising a plurality of feature values corresponding to a plurality of features;
generate a particular node of the plurality of decision nodes by:
selecting a subset of the plurality of features and a subset of the input data;
using one or more queries to the database, for each feature of the subset of the plurality of features, to calculate an information gain associated with the feature based on the subset of the input data by selecting a subset of the plurality of feature values and calculating the information gain associated with each of the subset of the plurality of feature values by calculating a reduction in entropy from an initial state to a subsequent state when a condition related to each of the subset of the plurality of feature values is introduced;
identifying a particular feature of the subset of the plurality of features associated with a highest information gain; and
associating the particular node with the particular feature, wherein the particular node causes the decision tree to branch based on the particular feature.

17. The decision tree training system of claim 16, wherein the processors are further configured to be capable of executing the stored programmed instructions to further cause generating the plurality of decision nodes by performing the selecting, calculating, identifying, and associating for each decision nodes of the plurality of decision nodes of the decision tree, wherein generating at least a portion of multiple decision nodes among the plurality of decision nodes is performed in parallel.

18. The decision tree training system of claim 17, wherein the processors are further configured to be capable of executing the stored programmed instructions to further cause the processors to:
generate a random forest comprising a plurality of decision trees by generating, for each decision tree of the plurality of decision trees, a respective plurality of decision nodes; and
generate a query to the database corresponding to the random forest, wherein the query, when executed using the database, applies each decision tree of the plurality of decision trees to a set of input data.

19. The decision tree training system of claim 16, wherein calculating the information gain associated with each feature comprises:
determining a data type associated with the feature;
based on the data type, identifying one or more conditions for partitioning the subset of the input data;
calculating a respective information gain for each condition of the one or more conditions; and
selecting the highest respective information gain as the information gain associated with the feature.

20. The decision tree training system of claim 19, wherein:
the data type is categorical data and identifying the one or more conditions comprises identifying a plurality of feature categories;
the data type is numerical data and identifying the one or more conditions comprises identifying a plurality of numeric value ranges; or
the data type is strings and identifying the one or more conditions comprises identifying a plurality of token sets, each token set comprising one or more string tokens.

* * * * *